United States Patent [19]

Mouri et al.

[11] Patent Number: 5,160,162
[45] Date of Patent: Nov. 3, 1992

[54] SHOCK ABSORBER PRODUCING VARIABLE DAMPING FORCE

[75] Inventors: Naoki Mouri, Kariya; Kouji Hirao, Chiryu; Mutsuro Aoyama, Nagoya, all of Japan

[73] Assignee: Aisin Seiki Kabushiki Kaisha, Kariya, Japan

[21] Appl. No.: 672,633

[22] Filed: Mar. 20, 1991

[30] Foreign Application Priority Data

Mar. 21, 1990 [JP] Japan .................. 2-71695

[51] Int. Cl.⁵ .............................. B60G 11/26
[52] U.S. Cl. ..................... 280/707; 280/714
[58] Field of Search .......... 280/707, 714, 840, DIG. 1

[56] References Cited

U.S. PATENT DOCUMENTS

| 4,880,086 | 11/1989 | Knecht et al. | 280/714 |
| 4,936,423 | 6/1990 | Karnopp | 280/714 |
| 4,973,854 | 11/1990 | Hummel | 280/714 |

FOREIGN PATENT DOCUMENTS 58-194609 11/1983 Japan .
63-6238 1/1988 Japan .

Primary Examiner—Kenneth R. Rice
Attorney, Agent, or Firm—Burns, Doane, Swecker & Mathis

[57] ABSTRACT

An automotive shock absorber producing a variable damping force. The absorber comprises a cylinder, a piston slidably fitted in the cylinder, two hydraulic chambers partitioned from each other by the piston inside the cylinder, a passage permitting the two chambers to communicate with each other, a rotary valve capable of varying the area of the passage, an acceleration sensor fitted in the cylinder, and an electronic control unit (ECU). The ECU controls the rotary valve according to the acceleration detected by the sensor which includes a vibrating diaphragm and a piezoelectric device.

7 Claims, 2 Drawing Sheets

SHOCK ABSORBER PRODUCING VARIABLE DAMPING FORCE

FIELD OF THE INVENTION

The present invention relates to a shock absorber which is installed on a vehicle, produces a variable damping force, and is equipped with a means for detecting the acceleration.

BACKGROUND OF THE INVENTION

In order to produce a better ride on a vehicle, the damping force of the shock absorbers on the vehicle should be varied, depending on the road conditions and on the operating conditions of the vehicle. An automotive shock absorber equipped with such a damping force control mechanism is described in Japanese Patent Laid-Open No. 194609/1983, for example. In this known shock absorber, a piston is fitted in a cylinder to partition the inside of the cylinder into two hydraulic chambers. A passage is formed to place the hydraulic chambers in communication with each other. The damping force of the absorber is varied by changing the area of the passage by a rotary valve. In this prior art method for adjusting the damping force of the absorber according to the road conditions and the operating conditions of the vehicle, the conditions of the road surface and the operating conditions of the vehicle are estimated, using various sensors installed at various locations in the vehicle to control the damping force. That is, the road conditions and the operating conditions of the vehicle are known indirectly.

In the prior art method, the conditions of the road surface that the vehicle is meeting and the operating conditions of the vehicle are detected by the numerous sensors and, therefore, a very expensive control apparatus is necessary for the shock absorber in order to produce a variable damping force. Also, a sensor which detects the acceleration of the shock absorber does not exist. Consequently, the acceleration of the shock absorber itself is not taken into account in controlling the communication between the two hydraulic chambers formed in the cylinder.

SUMMARY OF THE INVENTION

It is an object of the invention to provide a shock absorber which detects the acceleration of the shock absorber itself to control the damping force produced by the absorber.

The above object is achieved by a shock absorber producing a variable damping force, said shock absorber comprising: a cylinder; a piston slidably fitted in the cylinder and partitioning the inside of the cylinder into two hydraulic chambers; a passage permitting communication between the two hydraulic chambers; a damping force-varying means for varying the area of the passage; an acceleration-detecting means fitted in the cylinder and acting to detect the conditions of the road surface; and a control means for controlling the damping force-varying means according to the acceleration detected by the acceleration-detecting means.

In one embodiment of the invention, the acceleration-detecting means includes a piezoelectric device, and the damping force produced by the absorber is controlled according to the output signal from the piezoelectric device.

Since the acceleration-detecting means is incorporated in the shock absorber, the acceleration of the absorber itself can be directly detected. In consequence, the damping effect of the shock absorber can be accurately made optimal according to the road surface conditions.

Other objects and features of the invention will appear in the course of the description thereof which follows.

DETAILED DESCRIPTION OF THE INVENTION

Figure 2:
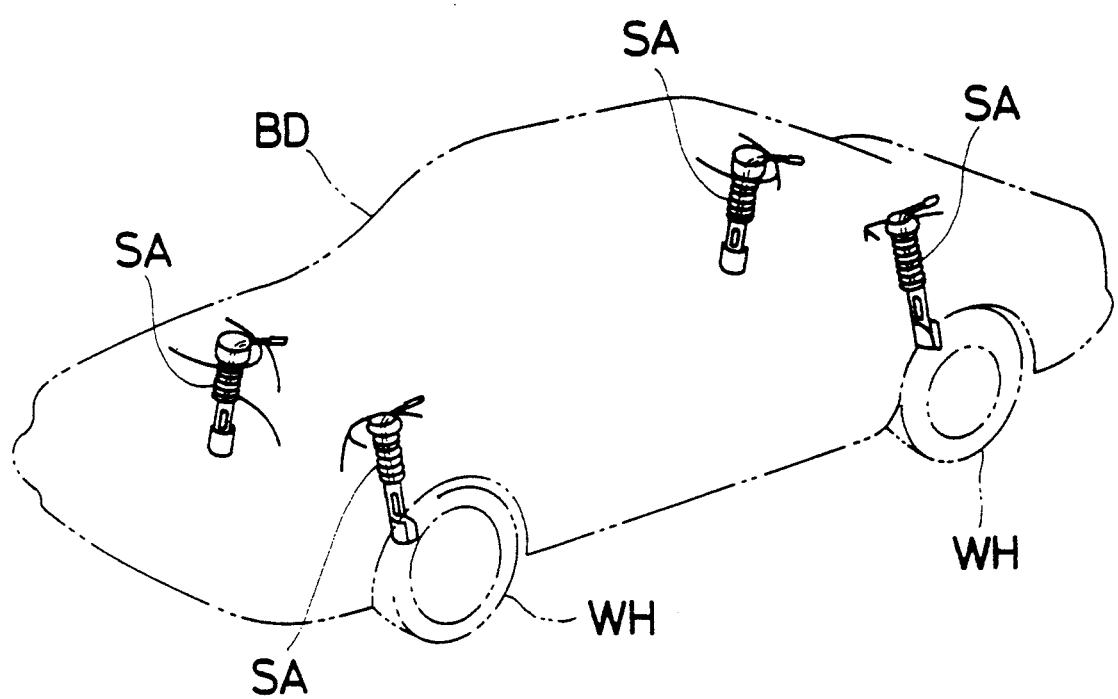
FIG. 2 is a schematic perspective view of a vehicle equipped with shock absorbers of the construction shown in FIG. 1.

Generally, as shown in FIG. 2, shock absorbers SA are mounted between the body BD of an automobile and the wheels WH to absorb the shock that the body BD receives.

Figure 1:
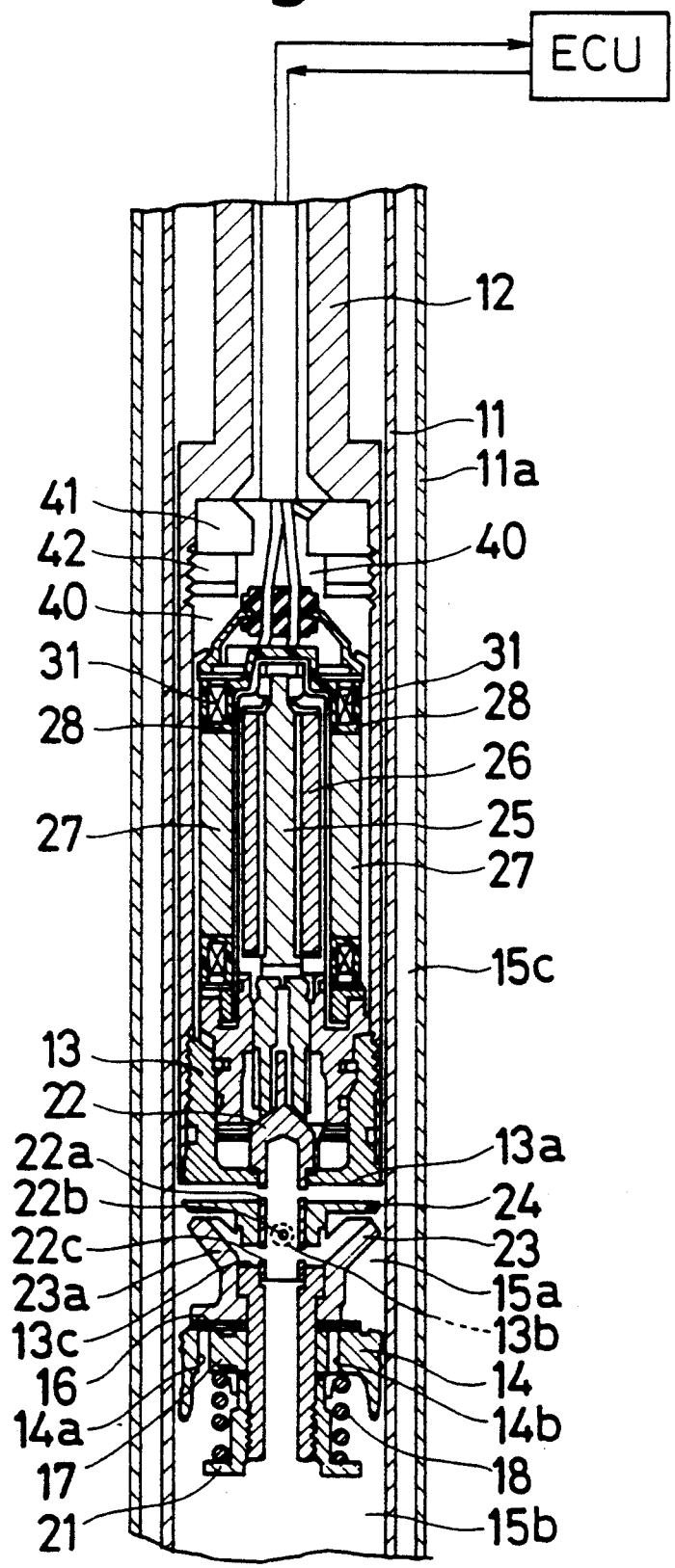
FIG. 1 is a vertical cross section of a damping force variable type shock absorber according to the invention.

Referring to FIG. 1, there is shown a damping force variable type shock absorber embodying the concept of the invention. This shock absorber is equipped with a cylinder 11 connected with the corresponding wheel. A first piston rod 12 connected to the automotive body and a second piston rod 13 screwed to the first rod 12 are mounted in the cylinder 11 so as to extend axially of the cylinder 11. The first and second piston rods 12 and 13 each assume a cylindrical form.

A piston 14 is mounted on the outer periphery of the second piston rod 13 so as to be slidable in the cylinder 11 in a liquid-tight manner. This piston 14 partitions the inside of the cylinder 11 into a first hydraulic chamber 15a and a second hydraulic chamber 15b. The cylinder 11 is accommodated in an outer cylinder 11a and cooperates with this outer cylinder 11a to form a reservoir chamber 15c. Valves 16 and 17 are mounted on the upper end surface and on the lower end surface, respectively, of the piston 14. The valve 16 is biased downward by the spring action of the valve itself at all times. The valve 16 permits the working oil to flow only from the second hydraulic chamber 15b to the first hydraulic chamber 15a through a passage 14a formed in the piston 14. The valve 17 is urged upward at the upper end of a spring 18 and allows the working oil to flow only from the first hydraulic chamber 15a to the second hydraulic chamber 15b via a passage 14b formed in the piston 14. The lower end of the spring 18 is supported by a nut 21 screwed to the outer lower end surface of the second piston rod 13. Each of the oil passages including the valves 16, 17 and the passages 14a, 14b, respectively, forms an orifice.

A rotary valve 22 is rotatably held on the inner surface of the second piston rod 13 to form a damping force-varying means. Three sets of orifices 22a, 22b, and 22c extend through the rotary valve 22 and are located at three different heights. These sets of orifices have different diameters. The orifices of each set are regularly circumferentially spaced from each other. Three pairs of holes 13a, 13b, and 13c are formed in the second piston rod 13 at the same heights as the three sets of orifices 22a, 22b, 22c, respectively. When the rotary valve 22 is in any one of given angular positions, the inner ends of the holes 13a, 13b, and 13c face their corresponding orifices of the three sets of orifices 22a, 22b, 22c. The outer end of the hole 13a opens into the first hydraulic chamber 15a. The outer ends of the holes 13b and 13c are connected with the inner ends, respectively, of oil passages 23a formed in a cylindrical member 23 which is fixedly mounted on the outer surface of the second piston rod 13. Note that the oil passage connected with the hole 13b is not shown. A check valve 24 is mounted at the outer ends of the oil passages 23a. The check valve 24 is mounted between the upper end surface of the cylindrical member 23 and the second piston rod 13 and always biased downward by the action of a spring (not shown) to permit the working oil to flow only from the oil passages 23a to the first hydraulic chamber 15a.

The area of the opening of the valve mounted between the first hydraulic chamber 15a and the second hydraulic chamber 15b can be switched between plural values according to the combination of the opened ones of the three sets of orifices 22a, 22b, 22c corresponding to the angular position of the rotary valve 22. In the present example, the area of the opening can be switched between three different values. That is, the damping force of this shock absorber can be switched between three different values. The damping force of the lengthening portion of the shock absorber, i.e., the first and second piston rods 12, 13 move upward relative to the cylinder 11 in this portion, is made larger than the damping force of the shortening portion of the absorber, i.e., the rods 12 and 13 move downward relative to the cylinder 11 in this portion, by the action of the check valve 24.

A shaft 25 that rotates with the rotary valve 22 is connected at its lower end with the upper end of the valve 22. The shaft 25 is held in the first piston rod 12 so as to be rotatable about the axis. A permanent magnet 26 is affixed to the outer surface of the shaft 25. Yokes 27 made of a magnetic material are fixedly mounted on the inner surface of the first piston rod 12 which is opposite to the magnet 26. Coils 31 are wound around the yokes 27 via resinous members 28. In this example, the number of the yokes 27 is four. Also, the coils 31 are four in number. These yokes 27 and coils 31 are arranged along the inner surface of the first piston rod 12. The angular positions of the permanent magnet 26 and the shaft 25 are determined, depending on which of the coils 31 is energized. A space 40 is formed above the first piston rod 12, and an acceleration sensor 41 is accommodated in the space 40. The sensor 41 is fixed with a clamping member 42 which is screwed to the inside cylinder of the first piston rod 12.

Figure 3:
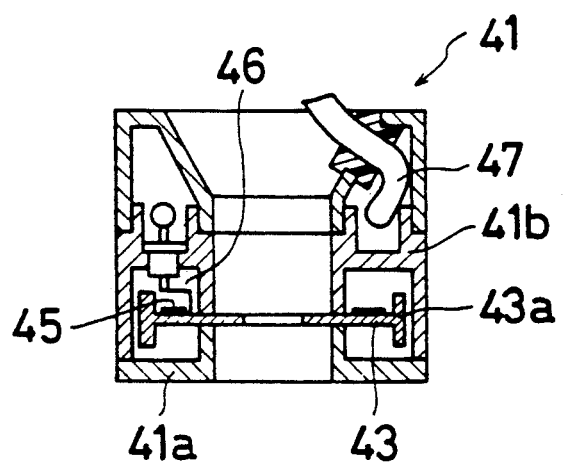
FIG. 3 is a cross-sectional view of the acceleration sensor incorporated in the absorber shown in FIG. 1.

The acceleration sensor 41 is next described by referring to FIG. 3. The sensor 41 comprises a first housing 41a, a second housing 41b, and a diaphragm 43 held between these two housings. The diaphragm 43 that vibrates comprises a flat annular plate portion and flanges 43a extending upright from the flat plate portion. A piezoelectric, device 45 is attached to the flat plate portion adjacent to either flange 43a. An electrode (not shown) is formed on the device 45. An output lead 46 is connected with the electrode and also with a terminal 46 which, in turn, connects with an output line 47. This output line 47 is connected with an electrical control unit (ECU).

When vibration is transmitted to the shock absorber from the road surface, a voltage is developed across the piezoelectric device 45 by the piezoelectric effect. The produced voltage is amplified by an amplifier included in the ECU and then processed by a damping force control circuit to produce a control signal for the rotary valve 22. The rotary valve 22 is actuated in response to this control signal to control the communication between the first and second hydraulic chambers 15a, 15b so that oscillation of the automotive body caused by irregularities in the road surface may quickly die out.

The operation of the shock absorber constructed as described above is now described. When an external signal is applied to energize any one of the coils 31, the corresponding one of the yokes 27 of the absorber is energized. Since the permanent magnet 26 is electromagnetically attracted or repelled by the energized yoke 27, the magnet rotates to a given angular position. As a result, the damping force of the shock absorber is switched to other value according to the angular position of the rotary valve 22 as described already.

In the novel construction, the rotary valve 22 is actuated in response to the output signal from the acceleration sensor 41. That is, the damping force produced by the shock absorber is controlled according to the acceleration detected by the sensor 41.

In the above example, the rotary valve constitutes the damping force-varying means. The damping force-varying means may also be formed by stacked piezoelectric devices which shorten and lengthen in response to a varying voltage.

As described thus far, the novel shock absorber capable of varying its damping force detects irregularities in the road surface quickly by the acceleration sensor. Therefore, the absorber is able to quickly control the damping force according to the road surface conditions. Hence, it produces an optimum ride.

Although certain specific embodiments of the present invention have been shown and described, it is obvious that many modifications thereof are possible. The present invention, thereof, is not intended to be restricted to exact showing of the drawings and description thereof, but is considered to include reasonable and obvious equivalents.

What is claimed is:

1. A shock absorber producing a variable damping force, comprising:
   a cylinder;
   a piston slidably fitted in the cylinder and partitioning the inside of the cylinder into two hydraulic chambers;
   a passage permitting the two hydraulic chambers to communicate with each other;
   damping force-varying means for varying the area of the passage;
   acceleration-detecting means positioned in the cylinder for detecting vibration of the shock absorber; and
   control means for controlling the damping force-varying means in accordance with the vibration detected by the acceleration-detecting means.

2. The shock absorber of claim 1, wherein said acceleration-detecting means includes a diaphragm and a piezoelectric device attached to the diaphragm.

3. The shock absorber of claim 1, including a first piston rod positioned within the cylinder for being connected to an automotive body, said acceleration-detecting means being positioned in a space located in said first piston rod.

4. The shock absorber of claim 3, including a second piston rod connected to said first piston rod, said piston being connected to said second piston rod.

5. The shock absorber of claim 1, wherein said acceleration-detecting means includes a diaphragm that is comprised of a flat annular plate portion and flanges extending upwardly and downwardly from an outer periphery of the annular plate portion.

6. The shock absorber of claim 5, wherein said acceleration-detecting means includes first and second housings, the annular plate portion of said diaphragm being held between the two housings.

7. The shock absorber of claim 5, wherein said acceleration-detecting means includes a piezoelectric device attached to the annular flat portion of the diaphragm adjacent the flanges.

* * * * *